United States Patent [19]
George

[11] 3,837,779
[45] Sept. 24, 1974

[54] BELT CARRIER DEVICE FOR PRESSES

[75] Inventor: David Weinschenk George, New Castle, Pa.

[73] Assignee: Wean United, Inc., Pittsburgh, Pa.

[22] Filed: Sept. 4, 1973

[21] Appl. No.: 394,434

[52] U.S. Cl. .............. 425/28 B, 425/38, 425/339, 425/343, 425/341
[51] Int. Cl..... B29d 29/00, B29h 7/22, B30b 15/00
[58] Field of Search .......... 425/28 B, 29, 30, 39 B, 425/40, 43, 38, 330, 338, 339, 340, 341, 343

[56] References Cited
UNITED STATES PATENTS

| 2,327,566 | 8/1943 | Slusher | 425/28 B |
| 2,867,845 | 1/1959 | Saver | 425/28 B |
| 3,619,332 | 11/1971 | Bongers | 425/28 B |
| 3,647,342 | 3/1972 | Hunt | 425/330 |

Primary Examiner—J. Howard Flint, Jr.
Attorney, Agent, or Firm—Henry C. Westin; Daniel Patch

[57] ABSTRACT

The disclosure pertains to a roller assembly which is movable from a position outside a belt press to a position within the press to support a belt being threaded through the press when the platens thereof are opened. The roller assembly comprises a cantilever collapsible arm secured to the frame of the press, the arm being extended and collapsed in a very small radius by a sprocket rack and pinion power system.

7 Claims, 3 Drawing Figures

BELT CARRIER DEVICE FOR PRESSES

In present day presses of the type illustrated in U.S. Pat. No. 3,647,342 dated Mar. 7, 1972 that issued to David G. Hunt for vulcanizing endless or continuous belting, difficulties have been experienced in preventing the uncured belting from brushing or dragging the lower heated press platen after the platens have been opened to permit the processed length of belting to be run out of the press and an unprocessed or green length brought into the press. Such contact between the green belting and the hot platens resulted in premature and uneven heating which resulted in surface defects in the belting.

The present invention provides a belt supporting device, including means for rendering a belt supporting member inoperative during the pressing operation and after pressing is completed and the press is opened to render the member operative to support the belting during its passage relative to the open platens of the press.

More particularly, the present invention provides one or more cantilever supported roller assemblies, the roller assemblies being supported by a pivotal collapsing arm assembly carried from the outside of a press to which the roller assembly is associated, the arm assembly comprising inner and outer members, the outer member carrying said roller assembly and being rotatably carried by said inner member, said rotation being effected by a driving system, said inner member being rotatably supported and rotated by a second driving system, which system also drives said first driving system.

It is a further object of the present invention to provide one or more sets of said roller arm assemblies, in which the roller assemblies of each set are arranged on opposite sides of the press, in which sets are provided for two or more platen openings of the press, and in which the roller arm assemblies for different openings are arranged in superposed positions and carried by a common driving means.

These objects, as well as other novel features and advantages of the present invention, will be better understood when the following description of one embodiment thereof is read along with the accompanying drawings of which:

Figure 1:
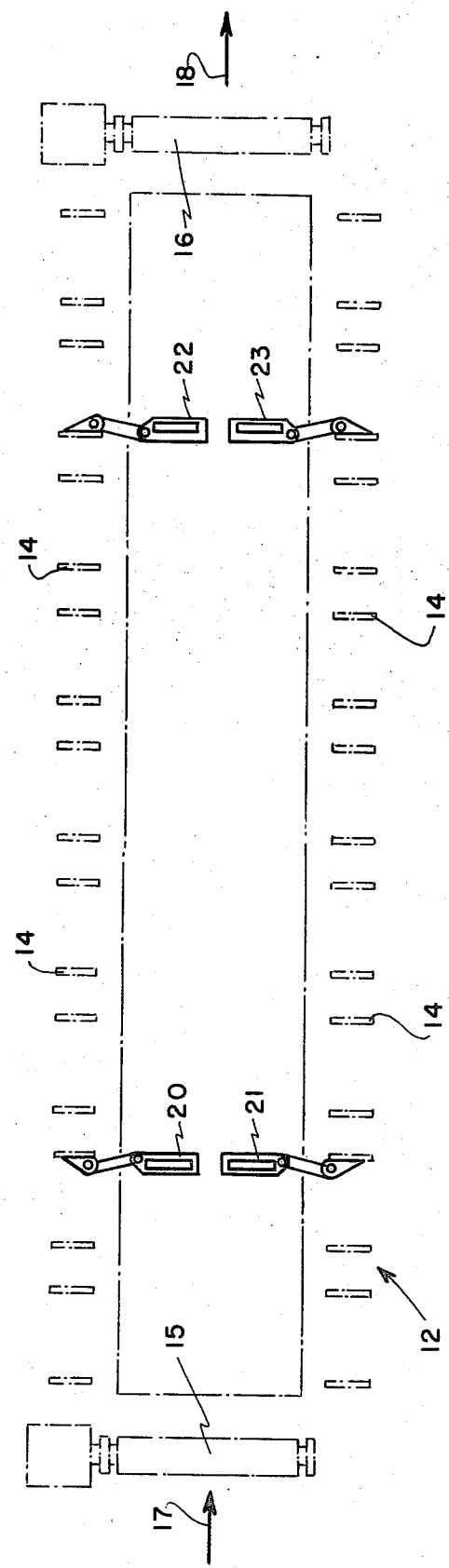
FIG. 1 is a schematic plan view of a multi-opening belt press illustrating in full line four belt supporting devices arranged in their operative positions.

In referring first to FIG. 1, there is shown in outline form one of the four platens of a multi-opening belt press 12 of the type illustrated in the aforesaid U.S. Pat. No. 3,647,342. The vertical side supporting columns 14 of the press are also illustrated, as well as part of the entry and delivery belt stretching devices 15 and 16, respectively. The arrows 17 and 18 serve to indicate the direction of travel of the belting to be vulcanized by the press 12. Because the present invention pertains to a mechanism auxiliary to the press a further and more detailed description of the press components is not deemed necessary.

Figure 2:
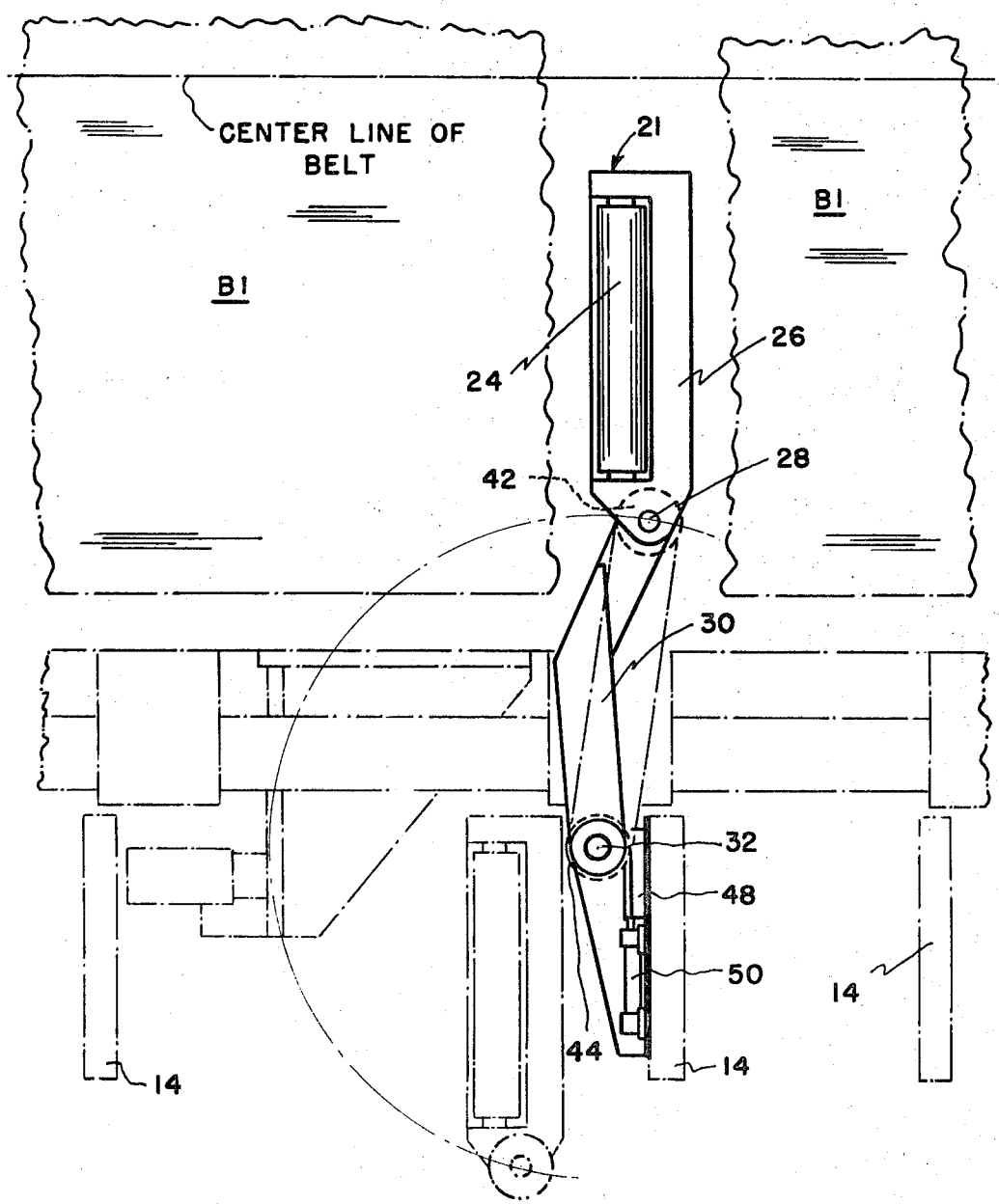
FIG. 2 is an enlarged plan view of the upper belt supporting device shown in FIG. 1.

FIG. 1 shows in full line two spaced-apart sets of belt supporting devices 20, 21, 22, and 23, each set comprises two identical roller arm assemblies for which reason only one will be described by referring to FIG. 2. As in FIG. 1, FIG. 2 illustrates the device 21 or 23 in plan having a freely rotatable roller 24 carried by an inverted C-shaped frame 26, the diameter of the roller 24 being such that its upper periphery projects above the frame 26, as can best be seen from FIG. 3.

Figure 3:
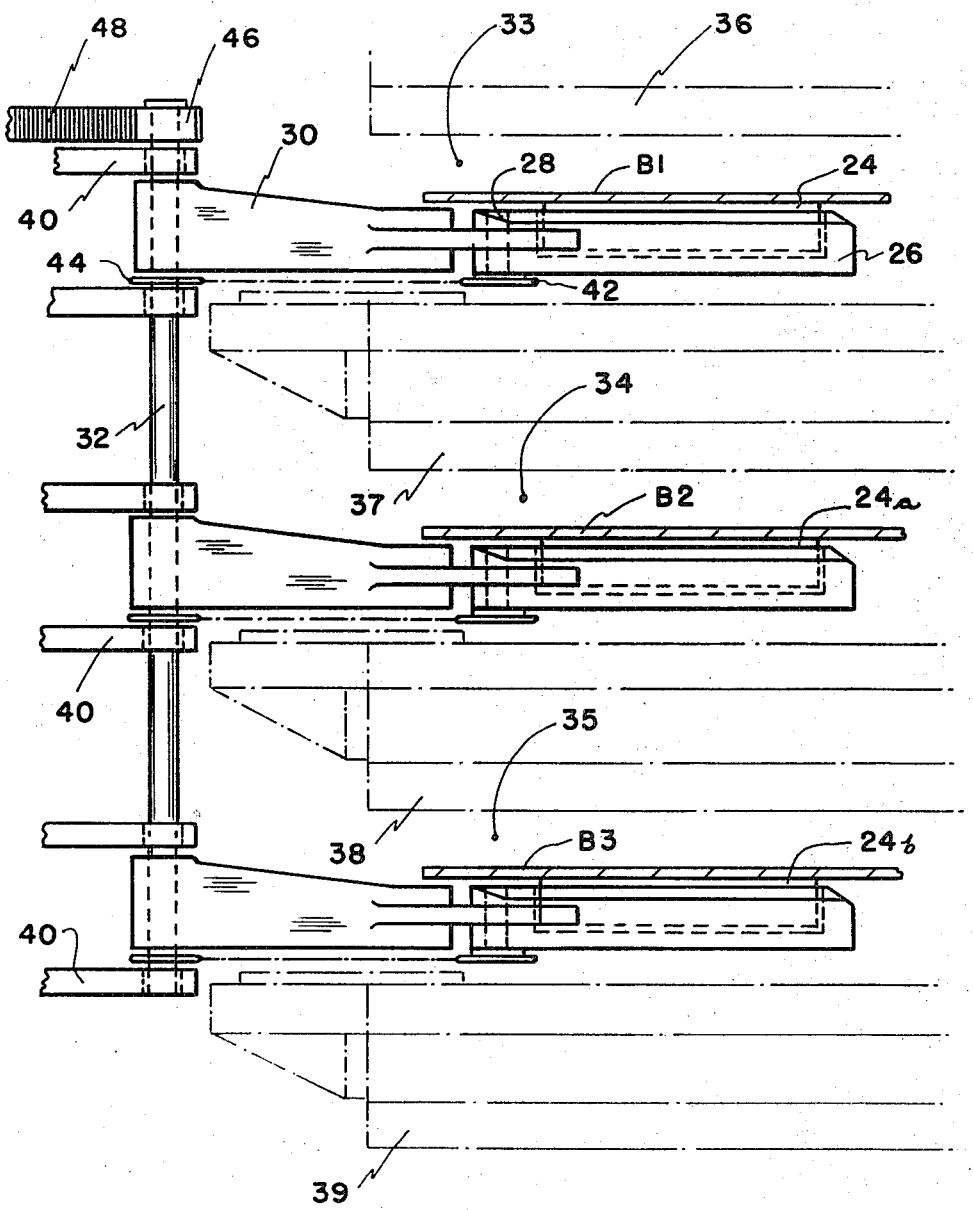
FIG. 3 is an elevational view of the device shown in FIG. 2, showing also the two lower belt supporting devices.

The inner end of the frame 26 is rotatably carried by a pin 28 which in turn is carried by an arm 30, the inner end of the arm 30 being secured to a vertical shaft 32 whereby the entire assembly is allowed to swing in a fixed horizontal plane. In referring again to FIG. 3, it will be noted that a roller assembly 24 is provided for each opening 33, 34, and 35 of the press 12, which openings are formed by the platens 36, 37, 38, and 39, the first platen 36 being a stationary one. FIG. 3 shows the press in its open condition with three roller assemblies shown supporting three different uncured portions B1, B2 and B3 of a continuous belt. The three-roller assemblies, identified in FIG. 3 as 24, 24a and 24b, are arranged one above the other having their arms 30 each drivenly secured to the vertical shaft 32, the shaft being rotatably supported by brackets 40.

To the pin 28 of each roller assembly 24 there is drivenly secured a chain sprocket 42 non-rotatably secured to the frame 26 which cooperates with a similar non-rotating sprocket 44 secured to one of the brackets 40. Rotation of the arms 30 will cause the frame 26 to rotate relative to the arm 30 in which the roller assembly 24 will assume an inoperative position outside the press as shown in phantom in FIG. 2. The rotation of each roller assembly 24, 24a and 24b, as just explained is accomplished in unison by providing a pinion 46 secured to the shaft 32, best shown in FIG. 3, the pinion being driven by a rack 48 which is advanced and retracted by a piston cylinder assembly 50, shown only in FIG. 2. The piston cylinder assembly and rack 48 is carried by an adjacent press column 14 to which also are secured the brackets 40 for the shaft 32.

In returning to FIG. 2, it will be observed that only the adjacent portion of the belt B1 is shown, in which the roller assembly 21, when in its operative position, is adapted to be placed within the opening of the press so as to engage the lower surface of the passing uncured belt in its central position, although some of the belt overhangs each side of the roller 24. Similarly, the other half of the passing belt will be supported by the opposed roller assembly 20, as will the roller assemblies 22 and 23. Once the new section or length of the belting has been positioned in the press, the roller assemblies 20-23 will be removed to their inoperative position allowing the press to perform the vulcanizing process. As shown in FIG. 2, the collapsing feature of the roller assemblies permit the assemblies to be brought to their inoperative positions, shown in phantom in FIG. 2 with reference to the assembly 21, within the very limited space defined by the two adjacent columns 14 of the press.

In accordance with the provisions of the patent statutes, I have explained the principle and operation of my invention and have illustrated and described what I consider to represent the best embodiment thereof.

I claim:

1. In combination with a press for processing belt-like material, wherein said press has an open and a closed condition, means arranged outside said press for carrying a belt supporting means, and means for causing said belt supporting means to move from an inoperative position outside the press where it is located when the press is in its closed condition to an operative position within the press where it is located when the press is in its open condition in order that when in the open press condition said belt supporting means can support a belt.

2. In combination with a press according to claim 1, wherein said belt supporting means comprises a cantileverly mounted arm assembly, said arm assembly having an outer member and an inner member, said outer member being rotatably carried by said inner member, and means for causing rotational movement between said members so that said outer member will extend itself when brought into said press and retract itself when brought out of said press.

3. In combination with a press according to claim 2, wherein said means for causing said rotation between said members includes a sprocket associated in a non-rotating manner with said outer member arranged to cooperate with a sprocket associated in a non-rotating manner with a support member, a chain engaging said sprockets, and driving means for rotating said inner member.

4. In combination with a press according to claim 1, wherein said belt supporting means includes a rotatable roller arranged to be brought into a supporting relationship with a belt.

5. In combination with a press according to claim 1, wherein said belt supporting means includes at least two spaced-apart roller assemblies for engaging a belt at two spaced points within said press.

6. In combination with a press according to claim 1, wherein said belt supporting means includes a set of roller assemblies constructed and arranged so that when in their operative positions they oppose each other and support a different portion of a belt.

7. In combination with a press according to claim 1, wherein said press has a number of parallel spaced apart openings and wherein said belt supporting means includes a separate belt supporting member for each opening, and further wherein said means for causing said supporting means to move includes means common to all of said supporting members for moving them in unison into and out of said press.

* * * * *